(12) United States Patent
Wang et al.

(10) Patent No.: US 11,762,261 B2
(45) Date of Patent: Sep. 19, 2023

(54) PARAMETRIC LIGHT GENERATION METHOD AND ITS APPLICATION

(71) Applicant: SHAN DONG UNIVERSITY, Jinan (CN)

(72) Inventors: Zhengping Wang, Jinan (CN); Xuezhi Zhao, Jinan (CN); Fapeng Yu, Jinan (CN); Xun Sun, Jinan (CN); Xinguang Xu, Jinan (CN)

(73) Assignee: SHAN DONG UNIVERSITY, Jinan (CN)

( * ) Notice: Subject to any disclaimer, the term of this patent is extended or adjusted under 35 U.S.C. 154(b) by 0 days.

(21) Appl. No.: 17/445,785

(22) Filed: Aug. 24, 2021

(65) Prior Publication Data

US 2021/0389644 A1    Dec. 16, 2021

(30) Foreign Application Priority Data

Sep. 15, 2020    (CN) .......................... 202010964346.9

(51) Int. Cl.
*G02F 1/39* (2006.01)
*H01S 3/00* (2006.01)
(Continued)

(52) U.S. Cl.
CPC .............. *G02F 1/392* (2021.01); *G02F 1/353* (2013.01); *G02F 1/3544* (2013.01); *G02F 1/39* (2013.01);
(Continued)

(58) Field of Classification Search
CPC ......... G02F 1/392; G02F 1/395; H01S 3/0092
See application file for complete search history.

(56) References Cited

U.S. PATENT DOCUMENTS

| 6,614,584 B1* | 9/2003 | Govorkov | G02F 1/3544 |
| | | | 359/328 |
| 8,441,720 B2* | 5/2013 | Borguet | G02F 1/39 |
| | | | 359/326 |

(Continued)

FOREIGN PATENT DOCUMENTS

| CN | 110535020 B | * 9/2020 | .......... H01S 3/0941 |
| CN | 112397981 A | * 2/2021 | .............. H01S 3/08 |

(Continued)

*Primary Examiner* — Daniel Petkovsek
(74) *Attorney, Agent, or Firm* — CBM PATENT CONSULTING, LLC

(57) ABSTRACT

The invention is related to a parametric light generation method and its application and belongs to the technical field of laser and nonlinear optics. The generation method comprises steps as follows: a nonlinear optical material that meets the sum-frequency phase-matched conditions, namely it shall satisfy the energy conservation condition $\omega_p + \omega_i = \omega_s$ and the momentum conservation condition $n_p\omega_p + n_i\omega_i = n_s\omega_s$ simultaneously, is provided; laser light with a wavelength of $\lambda_p$ is injected into the said nonlinear optical material as pump light; then, the material will output signal light with a wavelength of $\lambda_s$, namely the tunable sum-frequency parametric light. With sum-frequency as the basic principle, the invention can realize frequency up-conversion and obtain visible and UV light sources through simple infrared light sources easily.

12 Claims, 14 Drawing Sheets

(51) Int. Cl.
    *G02F 1/35*    (2006.01)
    *G02F 1/377*    (2006.01)

(52) U.S. Cl.
    CPC ............ *G02F 1/395* (2013.01); *H01S 3/0092* (2013.01); *G02F 1/377* (2013.01)

(56) References Cited

U.S. PATENT DOCUMENTS

| | | | |
|---|---|---|---|
| 9,804,476 B2 * | 10/2017 | Luther-Davies | H01S 3/0057 |
| 11,289,870 B2 * | 3/2022 | Piccoli | G02F 1/35 |
| 2013/0294467 A1 * | 11/2013 | Moloney | H01S 5/18383 |
| | | | 372/20 |
| 2020/0059060 A1 * | 2/2020 | Shaw | G02F 1/39 |

FOREIGN PATENT DOCUMENTS

| | | | | |
|---|---|---|---|---|
| JP | H05100276 A | * | 4/1993 | ............... G02F 1/39 |
| WO | WO-2004049056 A1 | * | 6/2004 | ............... G02F 1/39 |
| WO | WO-2015179894 A1 | * | 12/2015 | ............ G02F 1/3551 |

\* cited by examiner

PARAMETRIC LIGHT GENERATION METHOD AND ITS APPLICATION

CROSS REFERENCES

This application claims priority to Chinese Patent Application Ser. No. CN202010964346.9 filed on 15 Sep. 2020.

TECHNICAL FIELD

The invention is related to a parametric light generation method and its application and belongs to the technical field of laser and nonlinear optics.

BACKGROUND ART

For now, the laser has been applied to various fields of human society. To meet the requirements of application, people usually use nonlinear optical frequency conversion technologies to obtain various laser wavelengths. The phase-matching technology was developed after the discovery of frequency doubling phenomenon in the 1960s, and the important nonlinear optical frequency conversion method was carried out in the art. The phase-matching technology overall consists of two major categories: sum frequency and differential frequency. The sum frequency are frequency doubling and cascaded frequency tripling. The optical parametric frequency conversion processes with phase matching, such as optical parametric generation, optical parametric oscillation, and optical parametric amplification, were considered as differential frequencies.

For the birefringent phase matching of bulk crystals and the quasi-phase matching of periodic crystals, the following energy conversion relationship applies: $\omega_p=\omega_s+\omega_i$ (namely $\omega_s=\omega_p-\omega_i$), where: $\omega_s$ denotes signal light, $\omega_p$ denotes pump light, and oi denotes idle frequency light. It is a second-order nonlinear optical effect and related to the second-order electric polarizability $X^{(2)}$. For the degenerate four-wave mixing of optical fibers, the following energy conversion relationship applies: $2\omega_p=\omega_s+\omega_i$ (namely $\omega_s=2\omega_p-\omega_i$). It is a third-order nonlinear optical effect and related to the third-order electric polarizability $X^{(3)}$. The perspective of signal light $\omega_s$, all the above optical parametric processes are generated by the differential frequencies between the pump light $\omega_p$ and the idle frequency light $\omega_i$. Therefore, they share the same basic principle of optical differential frequency.

Based on the optical differential-frequency principle, numerous patents disclosed the technologies on parametric light. For example, EP3273550A1 discloses an optical parametric waveform synthesizer and an optical waveform synthesis method; RU2688860C1 discloses a parametric light generator; US20120134377A1 discloses a polarization-entangled photon pair generator and its generation method; U.S. Pat. No. 6,940,639B1 discloses a phase-matched parametric light generation method in monolithic integrated intersubband optical devices; DE60000851T2 discloses a diode laser and the generation of parametric light; and RU2099839C1 discloses a parametric radiation generating device.

CN109739061A discloses a waveguide chip that realizes nonlinear frequency conversion based on the coupled waveguide. The kernel theory of the device is the three-wave and four-wave nonlinear differential frequency processes. It is to produce multiple waveguide regions and utilize the applied electric field to adjust the phase to realize the tuning of the output light by varying the waveguide spacing. When the pump light wavelength is 1550 nm, and the waveguide spacing varies from 400 nm to 900 nm, the wavelength of the entangled photons can be tuned from 1200 nm to 2300 nm. CN101895053A discloses a cascaded optical parametric conversion system and an optical parametric conversion method. The system consists of cascaded KTP crystals and KTA crystals, with the former used for the type-II phase-matched optical parametric conversion process of the pump light generated by the pumping sources and the latter used for the noncritical phase-matched and the 900 critical phase-matched parametric conversion process of the KTP crystal outputs. This method utilizes the KTP crystals to perform the type-II phase-matched optical parametric conversion process for the pump light generated by the pumping sources and the KTA crystals to perform the noncritical phase-matched or the 900 critical phase-matched parametric conversion process for the outputs of the KTP crystals.

All the existing technologies as mentioned above are based on differential frequencies: when the nonlinear optical medium is a crystal, the frequency of the signal light equals the difference in frequency between the pump light and the idle frequency light; when the nonlinear optical medium is a waveguide or an optical fiber, the frequency of the signal light equals the frequency of the pump light multiply two and minus the frequency of the idle frequency light; the frequency conversion range is subject to the restriction $\omega_s<2\omega_p$. There is still no report on the generation of parametric light through the sum frequency process, especially the three-wave or above nonlinear sum frequency in the art, which is disclosed by the present invention.

DESCRIPTION OF THE INVENTION

The phase-matched optical parametric frequency conversion is based on differential frequencies, the technologies in the art have disadvantages as follows: tunable optical parametric frequency conversion is available in the long-wave direction but not in the short-wave direction for the crystals ($\omega_s<\omega_p$); the frequency conversion of the waveguide and optical fiber can only be carried out in a limited frequency range near the pump light ($\omega_s<2\omega_p$), and the tuning of the signal light depends on the tuning of the pump light. In view of such shortcomings, the present invention discloses a parametric light generation method and its application in generating parametric light through the sum frequency process. This method can realize frequency up-conversion laser output easily following the basic physical mechanism $\omega_s=\omega_p+\omega_i$. Its advantages include short-wave frequency conversion ($\omega_s>\omega_p$), large frequency shift ($\omega_s$ can be larger than $2\omega_p$ and even $3\omega_p$) without tuning of the pump light.

Term interpretation:
1. GdCOB: Abbreviation of the gadolinium calcium oxoborate crystal; molecular formula: $GdCa_4O(BO_3)_3$.
2. YCOB: Abbreviation of the yttrium calcium oxy borate crystal; molecular formula: $YCa_4O(BO_3)_3$.
3. KDP: Abbreviation of the potassium dihydrogen phosphate; molecular formula: $KH_2PO_4$.
4. BBO: Abbreviation of the beta barium borate crystal; molecular formula: $\beta\text{-}BaB_2O_4$.
5. ($\theta$, $\phi$): The space direction denoted by the polar coordinates, where $\theta$ is the angle between the direction and the optical principal axis Z of the crystal, $\phi$ is the azimuth angle, namely the angle between the X-axis and the projection of the direction into the XY principal plane of the crystal.

The generating mechanism of the parametric light in the invention is as follows:

The optical parametric generation process described in the invention follows an energy transfer mechanism as shown in FIG. 1. FIG. 1(A) shows the cascade transition process of the one-photon absorption, relaxation, and sum-frequency, which is a $X^{(1)}+X^{(2)}$ effect, emits signal light with a frequency in the range of $\omega_p<\omega_s\leq2\omega_p$, and is referred to as the type-A sum-frequency optical parametric process in the invention. FIG. 1(B) shows the cascade transition process of the two-photon absorption, relaxation, and sum-frequency, which is a $X^{(3)}+X^{(2)}$ effect, emits signal light with a frequency in the range of $2\omega_p<\omega_s\leq3\omega_p$, and is referred to as the type-B sum-frequency optical parametric process in the invention. FIG. 1(C) shows the cascade transition process of the three-photon absorption, relaxation, and sum-frequency, which is a $X^{(5)}+X^{(2)}$ effect, emits signal light with a frequency in the range of $3\omega_p<\omega_s\leq4\omega_p$, and is referred to as the type-C sum-frequency optical parametric process in the invention. FIG. 1(D) shows another cascade transition process of the three-photon absorption, relaxation, and sum-frequency. Distinguished from the first three effects, the photons of the pump light in this effect do not participate in the final sum frequency process directly. Instead, they will first be relaxed into the two photons of the idle frequency light—$\omega_{i1}$ and $\omega_{i2}$ and generate the photon $\omega_s$ ($2\omega_p<\omega_s<3\omega$) of the signal light through sum-frequency mixing. The effect in FIG. 1(D) is a $X^{(3)}+X^{(1)}+X^{(2)}$ effect and is referred to as the type-D sum-frequency optical parametric process in the invention. From the perspective of signal light generation, the above optical parametric generation processes are all sum-frequency processes ($\omega_s=\omega_p+\omega_i$ or $\omega_s=\omega_{i1}+\omega_{i2}$), which is essentially distinguished from the previous differential-frequency optical parametric generation effects. The combination of the second-order nonlinear optical effect and the photon absorption and relaxation effect can generate effective and wide-range tunable sum-frequency parametric light. All methods of generating parametric light through sum frequency based on the above mechanism or similar mechanisms and their related applications are within the protection scope of the invention, no matter how many pump light photons are involved and they are involved directly or indirectly.

The technical solution of the invention is as follows:

A parametric light generation method, which comprises the following steps:

A nonlinear optical material meets the requirement of sum-frequency phase-matched conditions. It shall satisfy the energy conservation condition $\omega_p+\omega_i=\omega_s$ (namely $1/\lambda_p+1/\lambda_i=1/\lambda_s$) and the momentum conservation condition $n_p\omega_p+n_i\omega_i=n_s\omega_s$ simultaneously, where s denotes signal light, p denotes pump light, and i denotes idle frequency light;

Laser with a wavelength of $\lambda_p$ is injected into the nonlinear optical material as pump light. Then, the material will output signal light with a wavelength of $\lambda_s$, namely the tunable sum-frequency parametric light.

According to a preferred embodiment of the invention, the sum-frequency phase-matching conditions can be changed continuously by adjusting the space direction, temperature, voltage, or microstructure parameters of the nonlinear optical material to realize the continuous change of $\lambda_s$ and output the tunable sum-frequency parametric light.

According to a preferred embodiment of the invention, light waves with wavelengths of $\lambda_i$ and $\lambda_s$ are generated and amplified spontaneously by the nonlinear optical material through parametric scattering or parametric fluorescence, instead of being input from outside. The invention refers to the solution as "sum-frequency optical parametric generation".

According to a preferred embodiment of the invention, light waves with wavelengths of $\lambda_i$ and $\lambda_s$ are generated and amplified spontaneously by the nonlinear optical material through parametric scattering or parametric fluorescence, instead of being input from outside; in the resonant cavity formed by adding cavity mirrors at both ends of the nonlinear optical material, the signal light will make multiple reflection and bounce back to gain significantly enhanced output. The invention refers to the solution as "sum-frequency optical parametric oscillation".

According to a preferred embodiment of the invention, low energy signal light $\lambda_s$ and high energy pump light $\lambda_p$ are provided at the input end, and they will interact with each other on the premises of satisfying the sum-frequency phase-matching conditions to amplify the signal light significantly at the output end at the cost of consuming the pump light. The invention refers to the solution as "sum-frequency optical parametric amplification".

According to a preferred embodiment of the invention, the nonlinear optical material is a bulk crystal with a single structure, a crystal with a periodic structure that can realize quasi-phase matching, an ordinary optical fiber, or a photonic crystal fiber.

According to a further preferred embodiment of the invention, the bulk crystal is GdCOB, YCOB, KDP, or BBO. By adding rare-earth ions to these materials, the fluorescence emissions of their characteristic wavebands can be enhanced. Then, by designing the signal light $\lambda_s$ or the idle frequency light $\lambda_i$ into the wavebands in combination with the phase-matching theory, the pump threshold of the sum-frequency optical parametric effect can be reduced to boost the output power and output energy of the signal light and improve the conversion efficiency.

According to a preferred embodiment of the invention, the pulse laser (for example, the femtosecond-level ultrafast laser) is to be used as the pump light. According to a further preferred embodiment of the invention, the pump light is to be focalized or reduced in beams for space shaping to boost its power density and improve the output energy and conversion efficiency of the signal light.

According to the invention, for the two solutions—"sum-frequency optical parametric generation" and "sum-frequency optical parametric amplification", the pulse laser (such as the ultra-fast laser with pulse width less than 1 ps) is preferred as the pumping source, and the pump light needs to be focalized or reduced in beams for space shaping to boost its power density and improve the output energy and conversion efficiency of the signal light. For the solution "sum-frequency optical parametric oscillation", the existence of the resonant cavity greatly reduces the system's requirement for the power density of the incident pump light, so the pumping source can be in either pulsed operation or continuous operation. Like the two solutions—"sum-frequency optical parametric generation" and "sum-frequency optical parametric amplification", the solution "sum-frequency optical parametric oscillation" can also improve the power density of its pump light through focusing or reduction in beams.

According to a preferred embodiment of the invention, the 1540 nm femtosecond laser is to be used as the pump light: when the nonlinear optical material is a GdCOB crystal processed along ($\theta=146°$, $\phi=0°$), the tunable laser output at the visible waveband of 485-770 nm can be obtained by rotating the crystal to adjust the sum-frequency phase-matching conditions; when the nonlinear optical material is a YCOB crystal processed along ($\theta=140°$, $\phi=0°$), the tunable laser output at the visible waveband of 450-770 nm can be obtained by rotating the crystal to adjust the sum-frequency phase-matching conditions.

According to a preferred embodiment of the invention, the 1056 nm femtosecond laser is used as the pump light, and when the nonlinear optical material is a YCOB crystal processed along (θ=149°, φ=0°), the tunable laser output at the visible waveband of 425-528 nm can be obtained by rotating the crystal to adjust the sum-frequency phase-matching conditions.

According to a preferred embodiment of the invention, the 1056 nm femtosecond laser is used as the pump light, and when the nonlinear optical material is a KDP crystal processed along (θ=41°, φ=45°), the tunable laser output at the visible waveband of 390-670 nm can be obtained by rotating the crystal to adjust the sum-frequency phase-matching conditions.

According to a preferred embodiment of the invention, the 1053 nm femtosecond laser is used as the pump light, and when the nonlinear optical material is a β-BBO crystal processed along (θ=23°, φ=30°), the tunable laser output at the visible waveband of 185-526.5 nm can be obtained by rotating the crystal to adjust the sum-frequency phase-matching conditions.

According to the invention, the following applications of the parametric light generation method are also available:

The sum-frequency parametric light generation of the lithography machine (193 nm) and the medical diagnosis and radiation treatment (325 nm);

The dual-wavelength sum-frequency parametric light generation of the ultraviolet differential absorption laser radar;

The dual-wavelength sum-frequency parametric light generation of the hemoglobin detection in carbon monoxide poisoning;

The dual-wavelength sum-frequency parametric light generation for the treatment of intractable port-wine stains;

The sum-frequency parametric light generation of the white light laser.

According to the invention, a parametric light generator which comprises a pump light source and a nonlinear optical medium sequentially arranged along the optical path is also made available. The nonlinear optical material meets the sum-frequency phase-matched conditions. It satisfies the energy conservation condition $\omega_p + \omega_i = \omega_s$ (namely $1/\lambda_p + 1/\lambda_i = 1/\lambda_s$) and the momentum conservation condition $n_p\omega_p + n_i\omega_i = n_s\omega_s$ simultaneously, where s denotes signal light, p denotes pump light, and i denotes idle frequency light.

According to a preferred embodiment of the invention, a focusing lens is also provided between the pump light source and the nonlinear optical medium.

According to a preferred embodiment of the invention, a color filter is also arranged behind the nonlinear optical medium along the light path.

According to a preferred embodiment of the invention, an input mirror of optical parametric oscillation is provided between the focusing lens and the nonlinear optical medium along the light path, and an output mirror of optical parametric oscillation is provided behind the nonlinear optical medium.

According to a preferred embodiment of the invention, a signal light source, a signal light reflecting mirror, and a beam combiner for the pump light and the signal light are also provided to enable the signal light generated by the signal light source to enter the focusing lens together with the pump light generated by the pump light source upon the reflecting of the signal light reflecting mirror and the combining of the beam combiner for the pump light and the signal light.

According to a preferred embodiment of the invention, behind the nonlinear optical medium is provided the second nonlinear optical medium along the optical path, between the pump light source and the nonlinear optical medium are provided the front mirror and the rear mirror of the beam reduction system, and a color filter is arranged behind the second nonlinear optical medium.

The theoretical core of the invention is the sum-frequency, namely the frequency of the signal light equals the sum of the frequency of the pump light and that of the idle frequency light. Therefore, it can achieve frequency up-conversion, and its final output signal light has a higher frequency and a shorter wavelength than the pump light. The sum-frequency generator is simple in construction, easy to operate, flexible to control, and can be tuned to a waveband farther away from the pump light. For example, it can realize a tunable output at the visible waveband of 400 nm to 700 nm when the pump light wavelength is 1550 nm.

The beneficial effects of the invention are as follows:
1. The invention presents an optical sum-frequency-based parametric light generation method and its application to make up for the deficiency of the past parametric light technology that can realize differential-frequency only. With this method, people can also realize tunable optical parametric frequency conversion toward the short wave direction with single-wavelength pump light, presenting a convenient, flexible, and near-perfect frequency up-conversion way free of spectrum limits.
2. The invention has particularly significant advantages in producing tunable deep-ultraviolet laser light. The past technologies usually connect in series multiple second-order nonlinear optical processes, including the frequency doubling and frequency tripling processes at the front end, the differential-frequency optical parametric process at the middle-end, and the frequency doubling and sum-frequency processes at the back end, and they need four to five nonlinear optical media. By contrast, the installation shown in FIG. 2 of the invention requires only one nonlinear optical medium, so it has an obvious price advantage. Also, as it is simple in construction, convenient to adjust, small in size, and with high reliability, it has high commercial value.
3. The invention opens up a new field of phase-matched optical parametric frequency conversion technologies and has important application prospects in industrial production, communication information, bio-medicine, environmental testing, national defense and military, scientific research, etc.

Where 1. Pump light source, 2. Pump light with a wavelength of $\lambda_p$, 3. Focusing lens, 4. Non-linear optical medium, 5. Color filter, 6. Signal light with a wavelength of $\lambda_s$, 7. Input mirror of optical parametric oscillation, 8. Output mirror of optical parametric oscillation, 9. Signal light source, 10. Signal light reflecting mirror, 11. Beam combiner of the pump light and the signal light, 12. Front mirror of the beam reduction system, 13. Rear mirror of the beam reduction system, 14. The first non-linear optical medium, 15. The second non-linear optical medium.

DETAILED EMBODIMENTS

The invention is further described in combination with the attached figures and embodiments as follows, but the protection scope of the present invention is not limited to this.

The invention presents a parametric light generation method, which comprises the following steps: A nonlinear optical material that meets the sum-frequency phase-matched conditions is provided. It shall satisfy the energy conservation condition $\omega_p + \omega_i = \omega_s$ (namely $1/\lambda_p + 1/\lambda_i = 1/\lambda_s$) and the momentum conservation condition $n_p\omega_p + n_i\omega_i = n_s\omega_s$ simultaneously. Laser light with a wavelength of $\lambda_p$ is injected into the nonlinear optical material as pump light. Then, the material will output signal light with a wavelength of $\lambda_s$. The sum-frequency phase-matching conditions can be changed continuously by adjusting the space direction, temperature, voltage, or microstructure parameters of the nonlinear optical material to realize the continuous change of $\lambda_s$ and output the tunable sum-frequency parametric light. On this basis, different technical routes can be selected depending on the needs, and the corresponding installations also vary.

Figure 2:
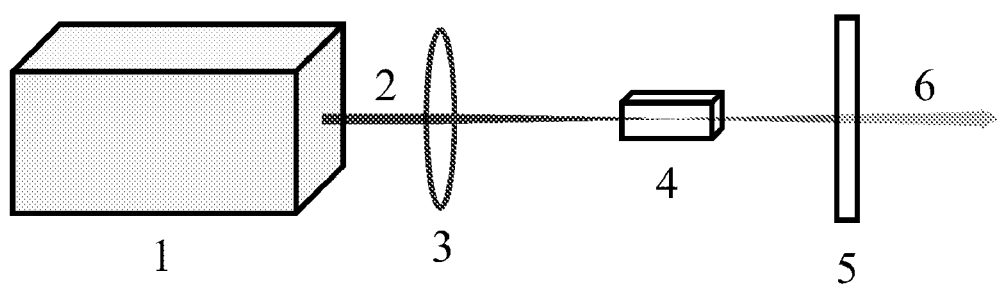
FIG. 2 shows the diagram of the installation for the "sum-frequency optical parametric generation" solution as described in Embodiments 1, 3, 4, 5, 6, and 7 of the invention.

(1) As shown in FIG. 2, the pump light source 1 and the focusing lens 3 are both arranged along the optical path. Among them, the pump light source 1 is used to generate the pump light with a wavelength of $\lambda_p$, and the focusing lens 3 plays a focusing role to improve the power density of the pump light 2. For the non-linear optical medium 4, only the pump light is input from outside, and the light waves with wavelengths of $\lambda_i$ and $\lambda_s$ are generated and amplified spontaneously by the nonlinear optical material through parametric scattering or parametric fluorescence. At the end of the non-linear optical medium 4, the color filter 5 will filter out the residual pump light $\lambda_p$ and the idle frequency light $\lambda_i$ to obtain the pure signal light 6 with a wavelength of $\lambda_s$. The invention refers to this solution as "sum-frequency optical parametric generation".

Figure 3:
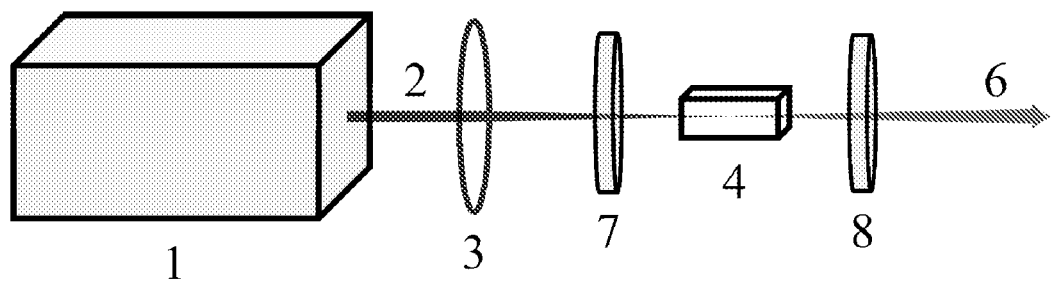
FIG. 3 shows the diagram of the installation for the "sum-frequency optical parametric oscillation" solution described in the invention.

(2) As shown in FIG. 3, the pump light source 1 and the focusing lens 3 are both arranged along the optical path. Among them, the pump light source 1 is used to generate the pump light with a wavelength of $\lambda_p$, and the focusing lens 3 plays a focusing role to improve the power density of the pump light 2. For the non-linear optical medium 4, only the pump light is input from outside, and the light waves with wavelengths of $\lambda_i$ and $\lambda_s$ are generated and amplified spontaneously by the nonlinear optical material through parametric scattering or parametric fluorescence. In the resonant cavity formed by adding cavity mirrors at both ends of the nonlinear optical material, the signal light will make multiple round trips to gain significantly enhanced output. The input mirror of the optical parametric oscillation 7 presents a high transmittance for the pump light and high reflectivity in the waveband of the signal light, and the output mirror of the optical parametric oscillation 8 presents a high reflectivity for the pump light and allows only part of the signal light to pass through, so the signal light 6 with a wavelength of $\lambda_s$ can be output. The invention refers to this solution as "sum-frequency optical parametric oscillation".

Figure 4:
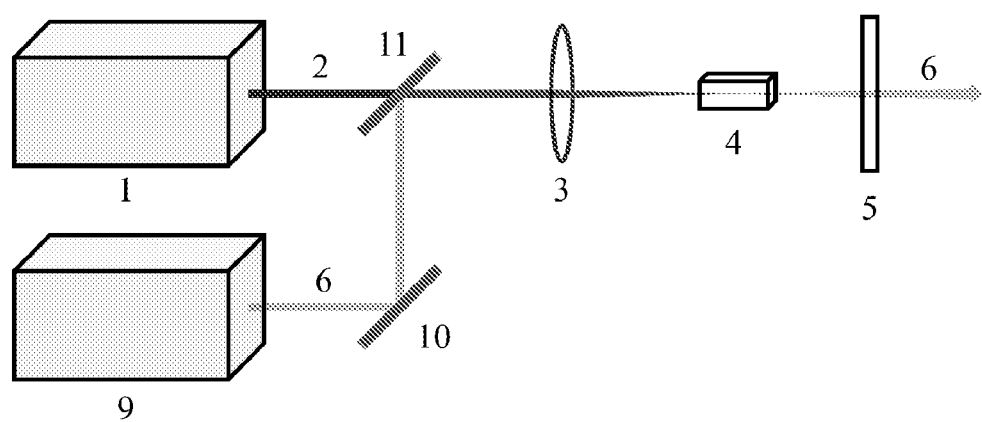
FIG. 4 shows the diagram of the installation for the "sum-frequency optical parametric amplification" solution described in the invention.

(3) As shown in FIG. 4, arranged along the optical path, the pump light source 1 generates the high-intensity pump light 2 with a wavelength of $\lambda_p$, and the signal light source 9 generates the low-intensity signal light 6 with a wavelength of $\lambda_s$. Upon going through the signal light reflecting mirror 10 and the beam combiner of the pump light and the signal light 11, the signal light will be combined with the pump light 2 with a wavelength of $\lambda_p$ (the signal light reflecting mirror 10 presents a high reflectivity for the signal light, and the beam combiner for the pump light and the signal light 11 presents a high reflectivity for the signal light and high transmittance for the pump light). The combined light then is focalized into the non-linear optical medium 4 by the focusing lens 3. $\lambda_p$ and $\lambda_s$ will interact with each other on the premises of satisfying the sum-frequency phase-matching conditions to amplify the signal light significantly at the output end at the cost of consuming the pump light. The color filter 5 will filter out the residual pump light $\lambda_p$ and the newly generated idle frequency light $\lambda_i$ to obtain the pure and high-energy signal light 6 with a wavelength of $\lambda_s$. If the signal light source 9 is tunable in wavelengths, the signal light with high energy and tunable wavelengths can be obtained at the output end, by adjusting the sum-frequency phase-matching conditions of the non-linear optical medium 4 according to the wavelengths of the signal light source 9. The invention refers to the solution as "sum-frequency optical parametric amplification".

The focusing lens 3 in the above three solutions can be replaced by an optical beam reduction system formed by two convex lenses with different focal lengths to improve the beam quality of the output light and reduce divergence.

Based on the three representative technical solutions above, a low-cost, miniaturized, wide-band tunable, precise, reliable, simple and effective frequency up-conversion laser device can be produced. Its signal light can meet the needs for tunable laser light in many fields. All sum-frequency parametric light generation methods based on the sum-frequency optical parametric generation mechanism as described in the invention and derived from the above solutions, as well as the related applications thereof, are within the scope of protection of the invention.

Embodiment 1

Figure 1:
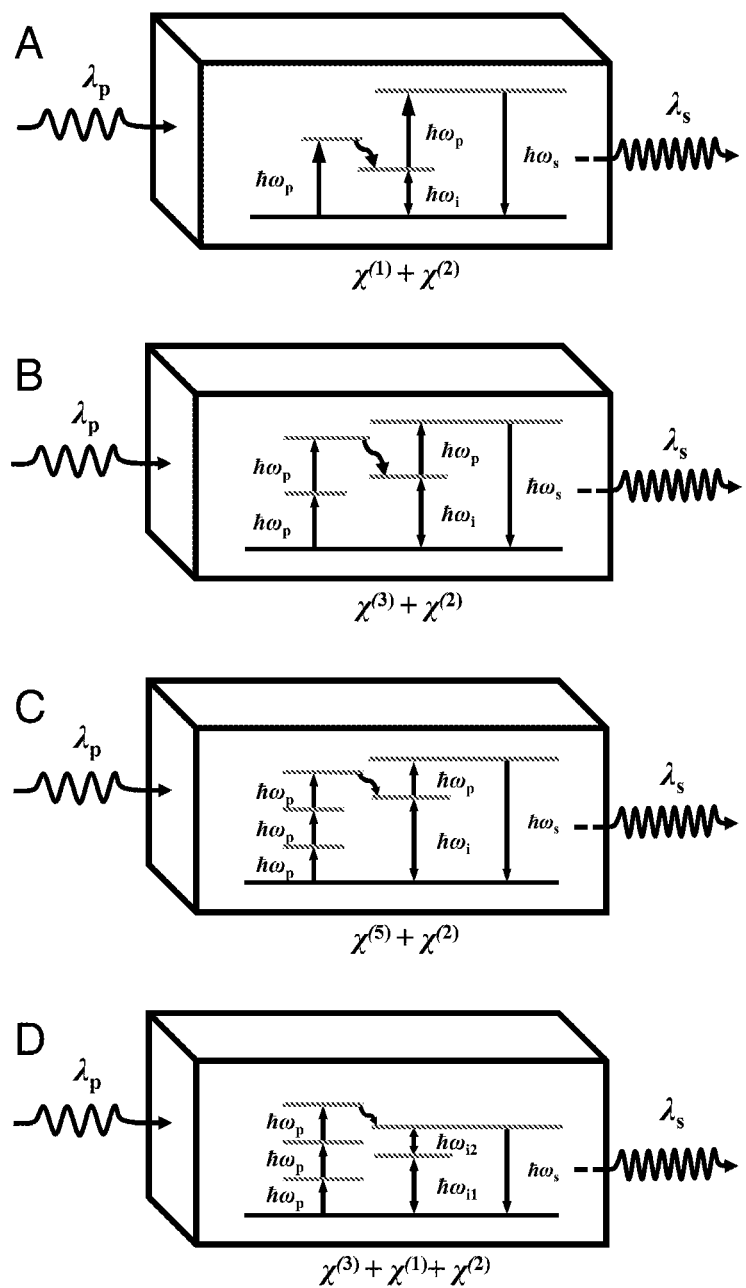
FIG. 1 is the mechanism diagram of the sum-frequency parametric light generation in the invention: the cascade transition process of the one-photon absorption, relaxation, and sum-frequency; the cascade transition process of the two-photon absorption, relaxation, and sum-frequency; the cascade transition process of the three-photon absorption, relaxation, and sum-frequency; and another cascade transition process of the three-photon absorption, relaxation, and sum-frequency.

A "sum-frequency optical parametric generation" solution with a GdCOB crystal pumped by a 1540 nm laser as the non-linear optical medium, which follows the mechanism as shown in B and C of FIG. 1. The installation is as shown in FIG. 2, with all parts arranged along the optical path. Among them, the pump light source 1 is an ultrafast laser with a wavelength of 1540 nm, a pulse width of 160 fs, and a repeated frequency of 100 kHz, the focusing lens 3 is with a 200 mm focal length, the non-linear optical medium 4 is a GdCOB crystal with the size of 6×6×10 mm$^3$ and processed along ($\theta=146°$, $\phi=00$), and the color filter 5 presents a high reflectivity for the wavelength 1540 nm and high transmittance for the waveband 300-800 nm. The test result of the solution is shown in FIG. 5 and FIG. 6.

Figure 5:
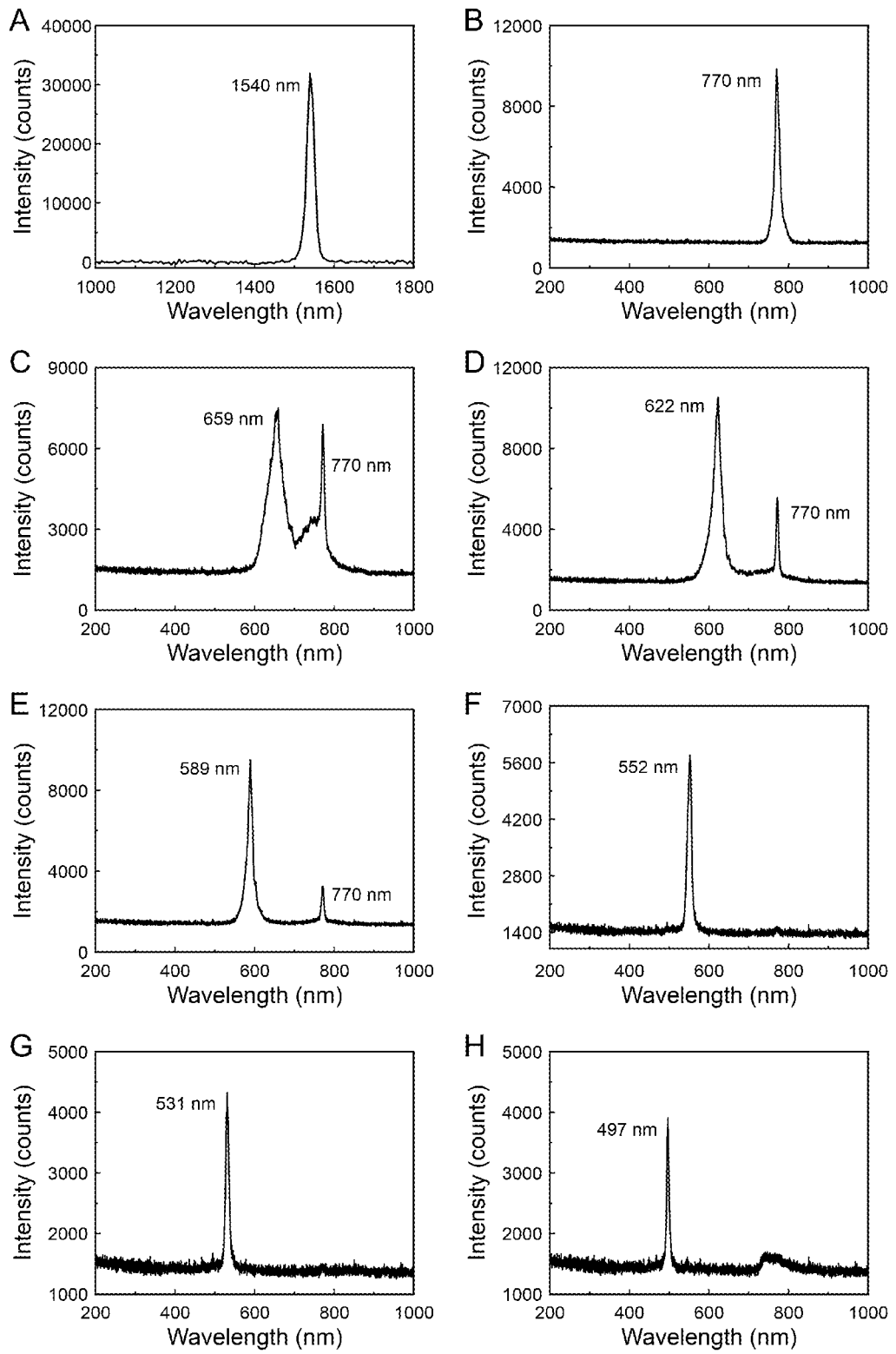
FIG. 5 shows the spectrogram obtained via the "sum-frequency optical parametric generation" solution based on 1540 nm pump light and a GdCOB crystal as described in Embodiment 1 of the invention.
Figure 6:
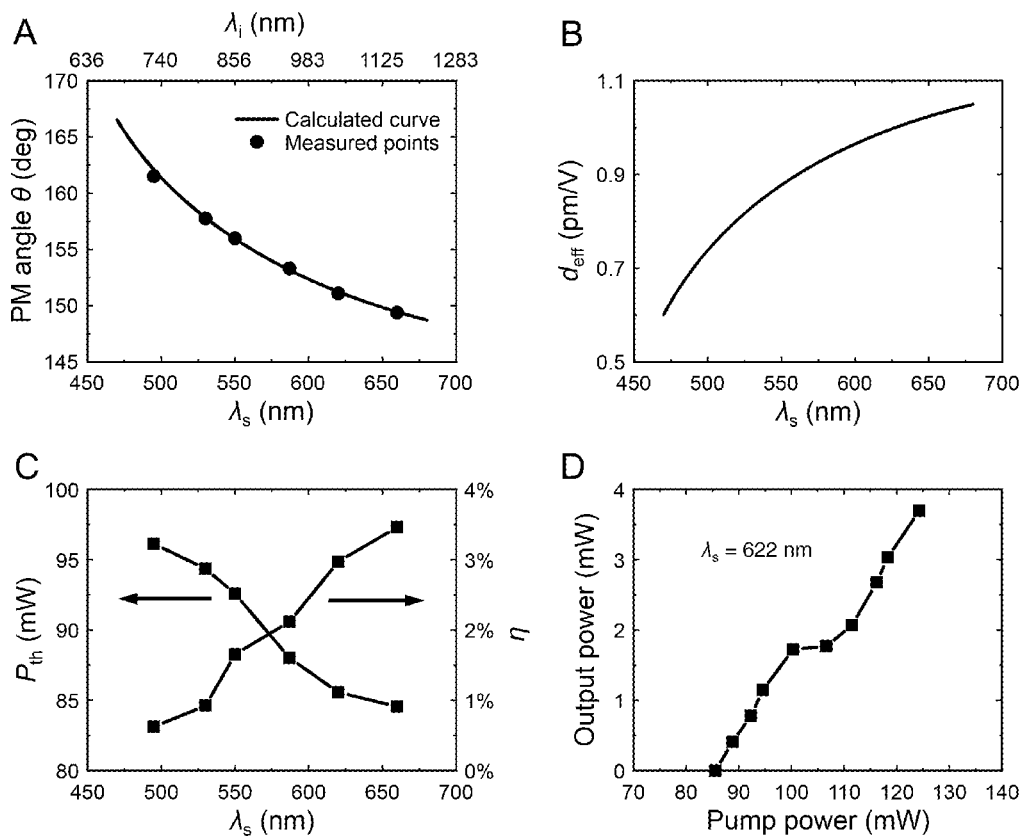
FIG. 6 shows the theoretical and experimental data obtained via the "sum-frequency optical parametric generation" solution based on 1540 nm pump light and a GdCOB crystal as described in Embodiment 1 of the invention.

FIG. 5 shows the signal light spectra obtained in different positions when the GdCOB crystal is rotated, where Figure A is the spectrum of the pump light ($\lambda_p=1540$ nm), and Figure B is the spectrum of the frequency doubling output ($\lambda_s=770$ nm) realized during the normal incidence of the crystal. The light path of the pump light in the crystal can be continuously changed by rotating the GdCOB crystal to satisfy the different sum-frequency phase-matching conditions, thereby realizing the continuous change of the wavelength $\lambda_s$ of the signal light and the output of the tunable sum-frequency parametric light. Based on the refraction law, the direction of light propagation within the crystal can be calculated from the external rotation angle of the crystal. Figures C through to H show the spectra of the signal light obtained in several representative directions, namely $\theta=149.4°$, 151.1°, 153.3°, 156.0°, 157.8°, and 161.5°. The $\phi$ is fixed as 0°, namely the crystal is rotated in its XZ principal plane only. The test results show that the installation can generate sum-frequency parametric light of 485-770 nm.

FIG. 6(A) shows the sum-frequency phase-matching curve ($1/\lambda_p+1/\lambda_i=1/\lambda_s$, where: $\lambda_p=1540$ nm, $\lambda_s$ denotes the bottom X-coordinate, the corresponding $\lambda_i$ denotes the top X-coordinate, and the Y-coordinate is the phase-matching angle $\theta$) calculated for Embodiment 1, as well as the corresponding experimental points. As shown in Figure A, the theoretical results are correlated with the actual values, thus confirming that this effect is a sum-frequency process. In addition, as the pump light polarizations are observed to be mutually perpendicular to the signal light polarizations, this phase matching turns out to be type-I. FIG. 6(B) shows the relationship between the effective nonlinear optical coefficient $d_{eff}$ and the wavelength $\lambda_s$ of the signal light. As can be seen from FIG. 6(B), the $d_{eff}$ increases along with the $\lambda_s$. Such a calculated law agrees with the experimental law obtained in FIG. 6(C), namely the output power and conversion efficiency of the signal light increases with the increase of the $\lambda_s$ and, at the same time, the pump threshold reduces. FIG. 6(D) shows the change relationship between the output power of the signal light and that of the pump light when $\lambda_s=622$ nm: the pump threshold is 86 mW, and the corresponding pump power density is 826 MW/cm$^2$; under the 124 mW pump power, the signal light output is 3.7 mW, and the optical conversion efficiency is 3.0%. If the pump light source and the non-linear optical medium are kept unchanged, the "sum-frequency optical parametric oscillation" solution in FIG. 3 can reduce the pump threshold and further improve the output power and conversion efficiency.

Embodiment 2

Figure 7:
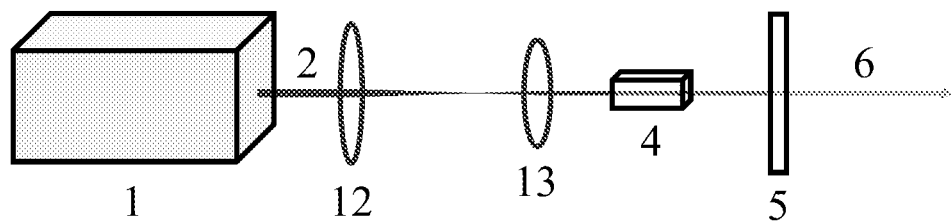
FIG. 7 shows the diagram of the installation for the "sum-frequency optical parametric generation" solution based on 1540 nm pump light and a GdCOB crystal as described in Embodiment 2 of the invention.

A "sum-frequency optical parametric generation" solution with a GdCOB crystal pumped by a 1540 nm laser as the non-linear optical medium, which follows the mechanism as shown in B and C of FIG. 1. The installation is as shown in FIG. 7, with all parts arranged along the optical path. Distinguished from that in FIG. 2, this installation uses an optical beam reduction system formed by two convex lenses with different focal lengths to replace the focusing lens 3. The pump light beam reduction system comprises the front mirror 12 and the rear mirror 13 in replacement of the focusing lens 3 as shown in FIG. 2. Therefore, the incident pump light beam of the crystal has better parallelism.

Among them, the pump light source 1 is an ultrafast laser with a wavelength of 1540 nm, a pulse width of 160 fs, and a repeated frequency of 100 kHz; the focal lengths of the front mirror 12 and the rear mirror 13 of the beam reduction system are 300 mm and 100 mm, respectively, the beam reduction ratio is 3:1; the non-linear optical medium 4 is a GdCOB crystal with the size of 6×6×10 mm$^3$ processed along ($\theta=146°$, $\phi=0°$); and, the color filter 5 presents a high reflectivity for the wavelength 1540 nm and high transmittance for the waveband 300-800 nm.

Figure 8:
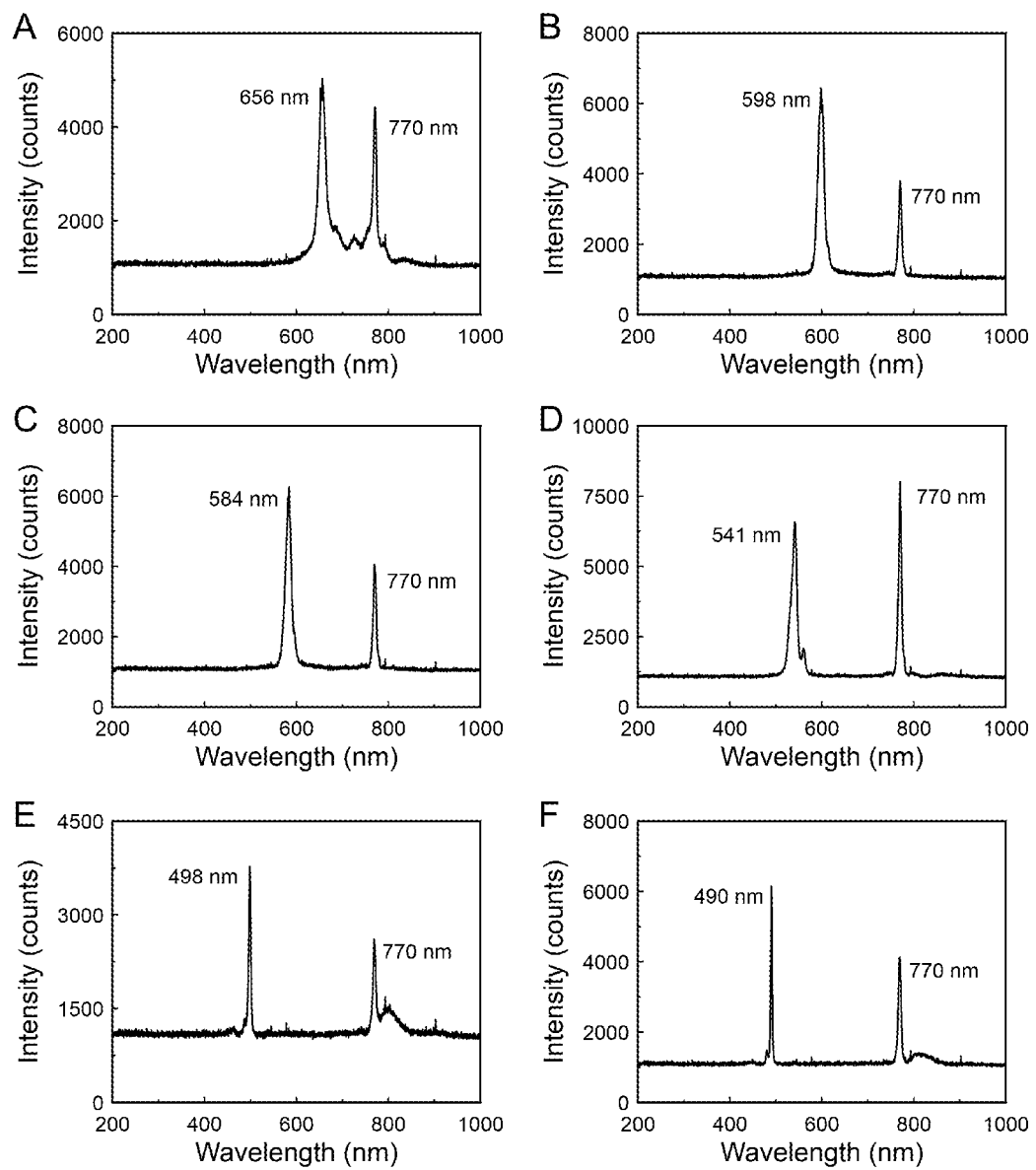
FIG. 8 shows the spectrogram obtained via the "sum-frequency optical parametric generation" solution based on 1540 nm pump light and a GdCOB crystal as described in Embodiment 2 of the invention.

The test result of the solution is shown in FIG. 8. It shows the signal light spectra obtained in different positions when the GdCOB crystal is rotated. The light path of the pump light in the crystal can be continuously changed by rotating the GdCOB crystal to satisfy the different sum-frequency phase-matching conditions, thereby realizing the continuous change of the wavelength $\lambda_s$ of the signal light and the output of the tunable sum-frequency parametric light. The results show that the installation can be used to generate sum-frequency parametric light of 490-770 nm. As the crystal sample used has good parallelism at the two end faces and can form partial resonant cavity under uncoated conditions, which is conducive to the output of frequency-doubled light in the tangential direction (namely in the frequency doubling direction of 1540 nm), frequency doubling signals with a wavelength of 770 nm are detected, more or less, in each spectrum. If frequency-doubled light is undesirable, the frequency-doubled signals in the tunable output may be eliminated through such technological means as reducing the parallelism of the end faces of the crystal, coating the two end faces with fundamental-frequency antireflective (AR) film, and coating the output end with the frequency-doubled high-reflective (HR) film.

Figure 9:
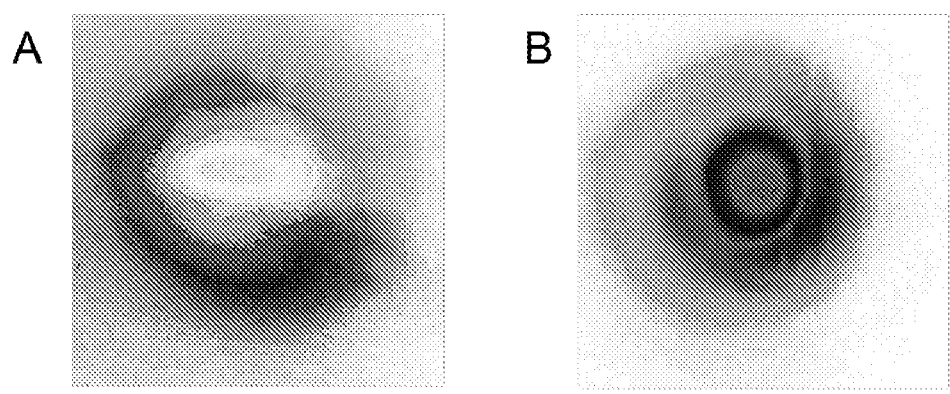
FIG. 9 shows the spot contrast diagram obtained via the "sum-frequency optical parametric generation" solution based on 1540 nm pump light and a GdCOB crystal as described in Embodiment 1 and Embodiment 2 of the invention.

FIG. 9 shows the light spot images of the installation in FIG. 2 and that in FIG. 7, among which FIG. 6(A) shows the light spot of the signal light ($\lambda_s$=497 nm) obtained by the installation in FIG. 2, and FIG. 6(B) shows the light spot of the signal light ($\lambda_s$=490 nm) obtained by the installation in FIG. 7. The comparison shows that the pump light beam reduction solution is more beneficial to obtaining light spots with higher beam quality.

Embodiment 3

A "sum-frequency optical parametric generation" solution with a YCOB crystal pumped by a 1540 nm laser as the non-linear optical medium, which follows the mechanism as shown in B of FIG. 1. The installation is as shown in FIG. 2, with all parts arranged along the optical path. Among them, the pump light source 1 is an ultrafast laser with a wavelength of 1056 nm, a pulse width of 160 fs, and a repeated frequency of 100 kHz, the focusing lens 3 is with a 200 mm focal length, the non-linear optical medium 4 is a YCOB crystal with the size of 4×4×10 mm³ and processed along (θ=149°, φ=0°), and the color filter 5 presents a high reflectivity for the wavelength 1064 nm and high transmittance for the waveband 300-800 nm. The results of the solution are shown in FIG. 10 and FIG. 11.

Figure 10:
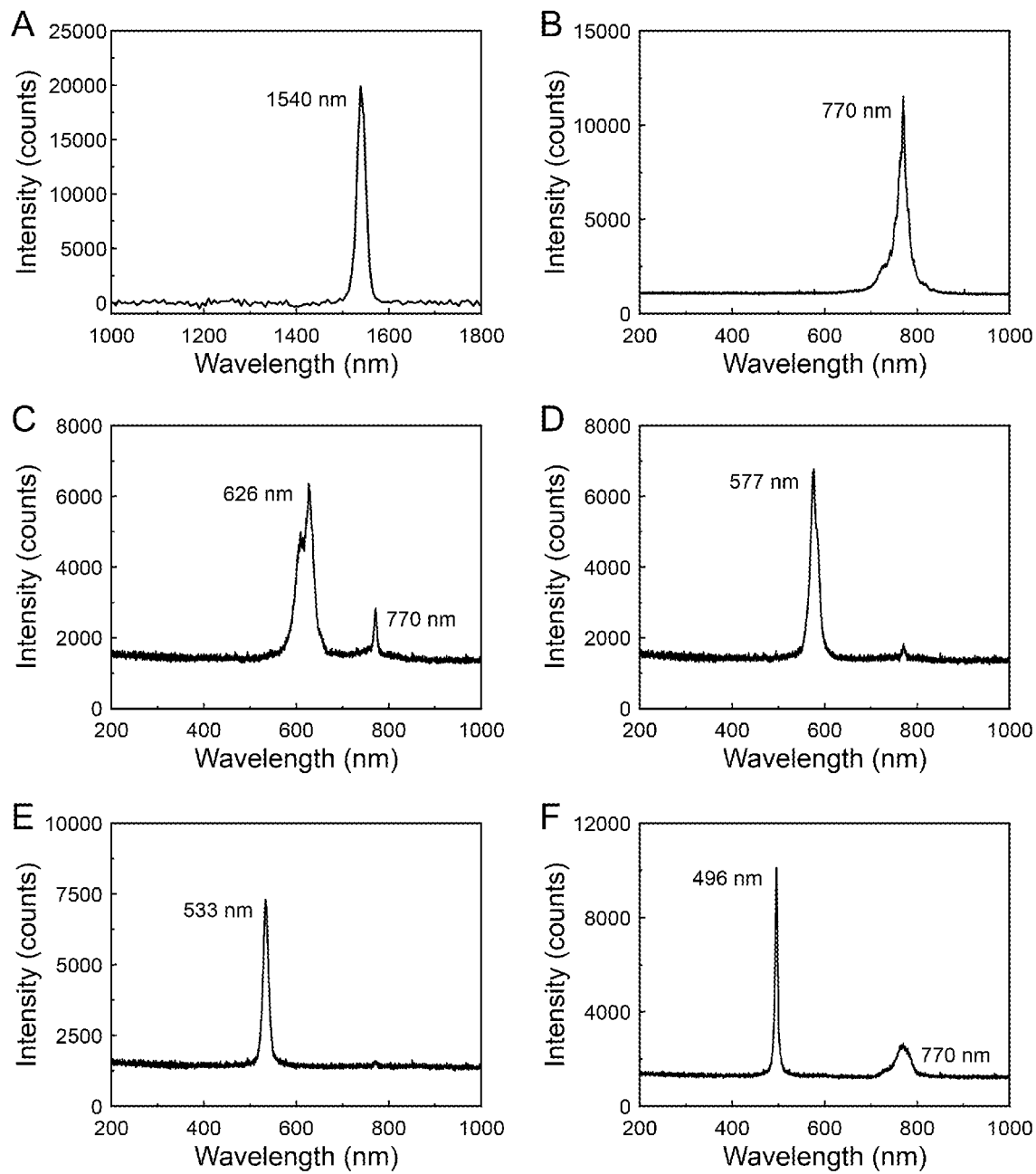
FIG. 10 shows the spectrogram obtained via the "sum-frequency optical parametric generation" solution based on 1540 nm pump light and a YCOB crystal as described in Embodiment 3 of the invention.

FIG. 10 shows the signal light spectra obtained in different positions when the YCOB crystal is rotated, where FIG. 6(A) is the spectrum of the pump light ($\lambda_p$=1540 nm), and FIG. 6(B) is the spectrum of the frequency doubling output ($\lambda_s$=770 nm) realized during the normal incidence of the crystal. The light path of the pump light in the crystal can be continuously changed by rotating the YCOB crystal to satisfy the different sum-frequency phase-matching conditions, thereby realizing the continuous change of the wavelength $\lambda_s$ of the signal light and the output of the tunable sum-frequency parametric light. Based on the refraction law, the direction of light propagation within the crystal can be calculated from the external rotation angle of the crystal. FIGS. 6(C) through to (H) show the spectra of the signal light obtained in several representative directions, namely θ=142.8°, 144.6°, 147.0°, and 149.8°. The 0 is fixed as 0°, namely the crystal is rotated in its XZ principal plane only. The test results show that the installation can generate sum-frequency parametric light of 450-770 nm.

Figure 11:
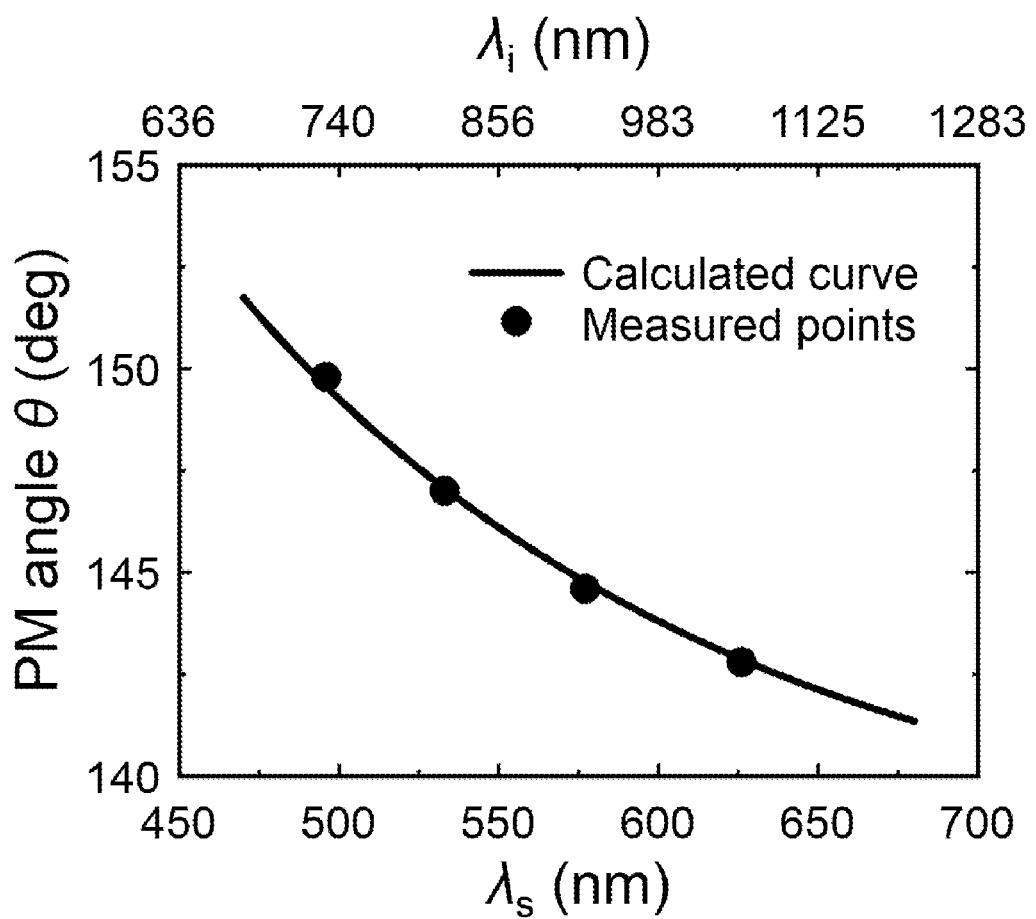
FIG. 11 shows the theoretical and experimental data obtained via the "sum-frequency optical parametric generation" solution based on 1540 nm pump light and a YCOB crystal as described in Embodiment 3 of the invention.

FIG. 11 shows the sum-frequency phase-matching curve ($1/\lambda_p+1/\lambda_i=1/\lambda_s$, where: $\lambda_p$=1540 nm, $\lambda_s$ denotes the bottom X-coordinate, the corresponding $\lambda_i$ denotes the top X-coordinate, and the Y-coordinate is the phase-matching angle θ) calculated for Embodiment 3, as well as the corresponding experimental points. As can be seen from FIG. 11, the theoretical results agree well with the measured values, thus confirming that this effect is a sum-frequency process. In addition, as the pump light polarizations are observed to be mutually perpendicular to the signal light polarizations, this phase matching turns out to be type-I. If the pump light source and the non-linear optical medium are kept unchanged, the "sum-frequency optical parametric oscillation" solution in FIG. 3 can reduce the pump threshold and further improve the output power and conversion efficiency.

Embodiment 4

A "sum-frequency optical parametric generation" solution with a YCOB crystal pumped by a 1056 nm laser as the non-linear optical medium, which follows the mechanism as shown in B and C of FIG. 1. The installation used is similar to that shown in FIG. 2, with all parts arranged along the optical path. Among them, the pump light source 1 is an ultrafast laser with a wavelength of 1540 nm, a pulse width of 160 fs, and a repeated frequency of 100 kHz, the focusing lens 3 is with a 200 mm focal length, and the non-linear optical medium 4 is a YCOB crystal with the size of 6×6×10 mm³ and processed along (θ=140°, φ=0°). As there is no suitable color filter, the solution uses no color filter 5. The result of the solution is shown in FIG. 12 and FIG. 13.

Figure 12:
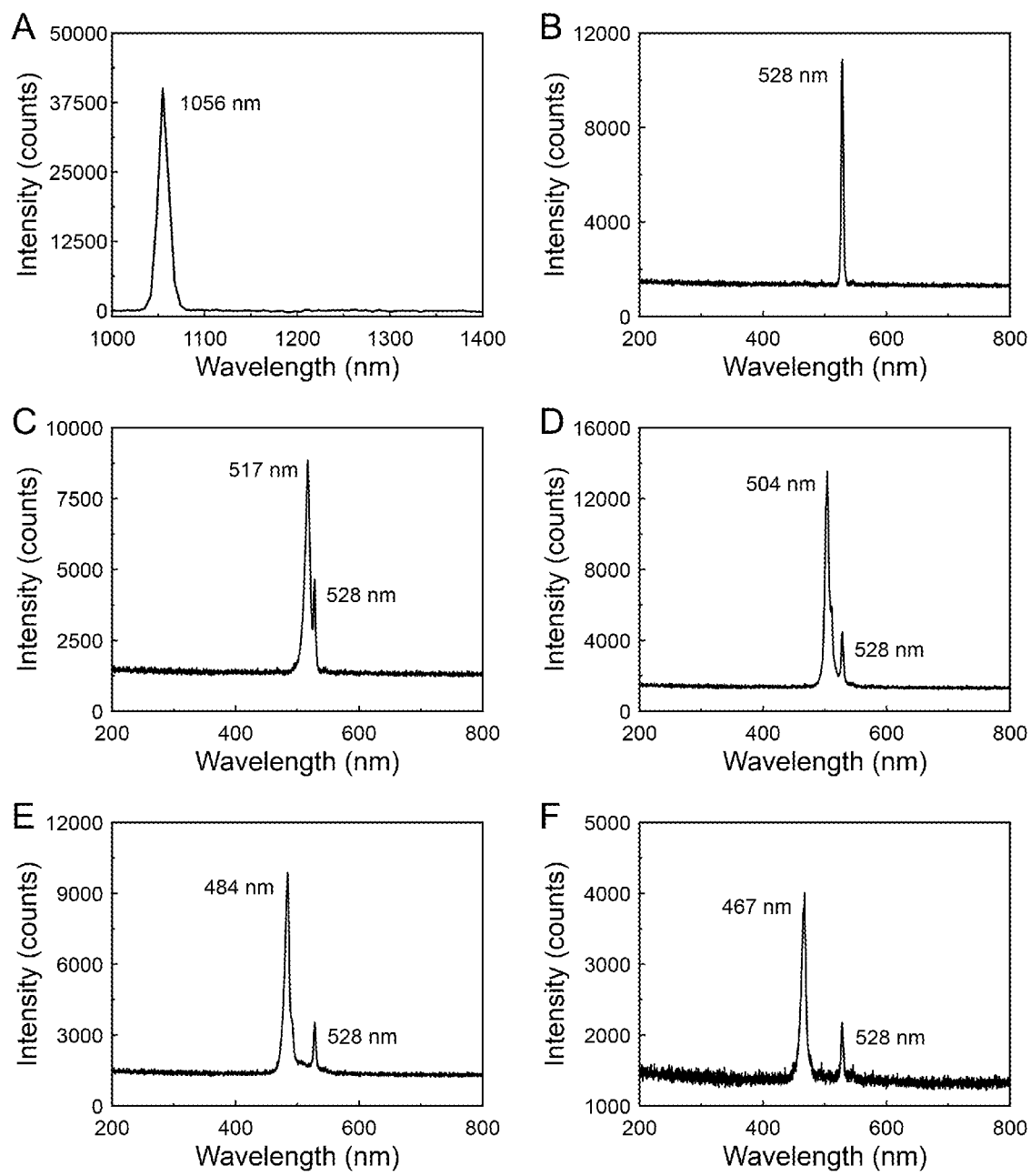
FIG. 12 shows the spectrogram obtained via the "sum-frequency optical parametric generation" solution based on 1056 nm pump light and a YCOB crystal as described in Embodiment 4 of the invention.

FIG. 12 shows the signal light spectra obtained in different positions when the YCOB crystal is rotated, where FIG. 12(A) is the spectrum of the pump light ($\lambda_p$=1056 nm), and FIG. 12(B) is the spectrum of the frequency doubling output ($\lambda_s$=528 nm) realized during the normal incidence of the crystal. The light path of the pump light in the crystal can be continuously changed by rotating the YCOB crystal to satisfy the different sum-frequency phase-matching conditions, thereby realizing the continuous change of the wavelength $\lambda_s$ of the signal light and the output of the tunable sum-frequency parametric light. Based on the refraction law, the direction of light propagation within the crystal can be calculated from the external rotation angle of the crystal. FIGS. 12(C) through to (F) show the spectra of the signal light obtained in several representative directions, namely θ=150.6°, 152.5°, 154.9°, and 157.3°. The φ is fixed as 0°, namely the crystal is rotated in its XZ principal plane only. The results show that the installation can generate sum-frequency parametric light of 425-528 nm.

Figure 13:
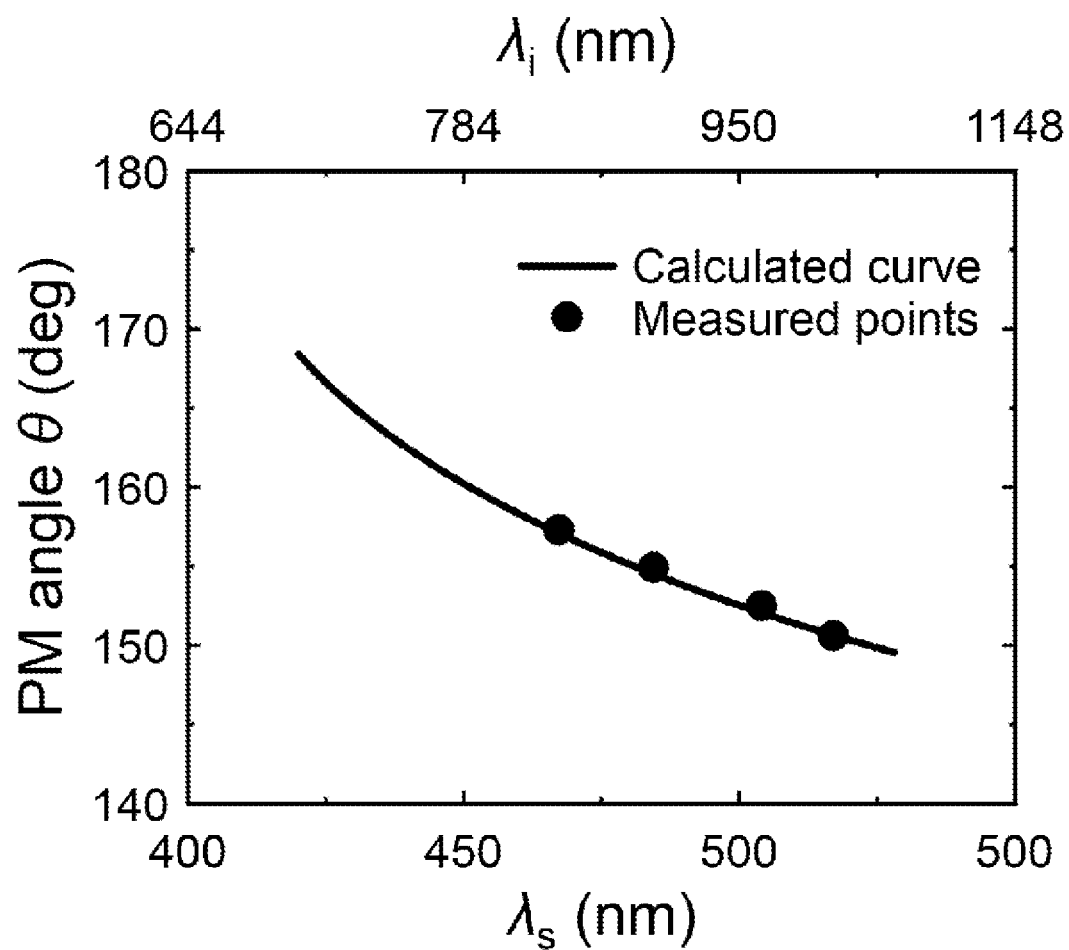
FIG. 13 shows the theoretical and experimental data obtained via the "sum-frequency optical parametric generation" solution based on 1056 nm pump light and a YCOB crystal as described in Embodiment 4 of the invention.

FIG. 13 shows the sum-frequency phase-matching curve ($1/\lambda_p+1/\lambda_i=1/\lambda_s$, where: $\lambda_p$=1056 nm, $\lambda_s$ denotes the bottom X-coordinate, the corresponding $\lambda_i$ denotes the top X-coordinate, and the Y-coordinate is the phase-matching angle θ) calculated for Embodiment 4, as well as the corresponding experimental points. As shown in FIG. 13, the theoretical results are correlated with the actual values, which suggests that this effect is a sum-frequency process. In addition, as the pump light polarizations are observed to be mutually perpendicular to the signal light polarizations, this phase matching turns out to be type-I. If the pump light source and the non-linear optical medium are kept unchanged, the "sum-frequency optical parametric oscillation" solution in FIG. 3 can reduce the pump threshold and further improve the output power and conversion efficiency.

Embodiment 5

A "sum-frequency optical parametric generation" solution with a KDP crystal pumped by a 1056 nm laser as the non-linear optical medium, which follows the mechanism as shown in A, B, and D of FIG. 1. The installation used is similar to that shown in FIG. 2, with all parts arranged along the optical path. Among them, the pump light source 1 is an ultrafast laser with a wavelength of 1056 nm, a pulse width of 160 fs, and a repeated frequency of 100 kHz, the focusing lens 3 is with a 200 mm focal length, and the non-linear optical medium 4 is a KDP crystal with the size of 50×30×13 mm$^3$ and processed along ($\theta$=41°, $\phi$=45°). As there is no suitable color filter, the solution uses no color filter 5. The results of the solution are shown in FIG. 14 and FIG. 15.

Figure 14:
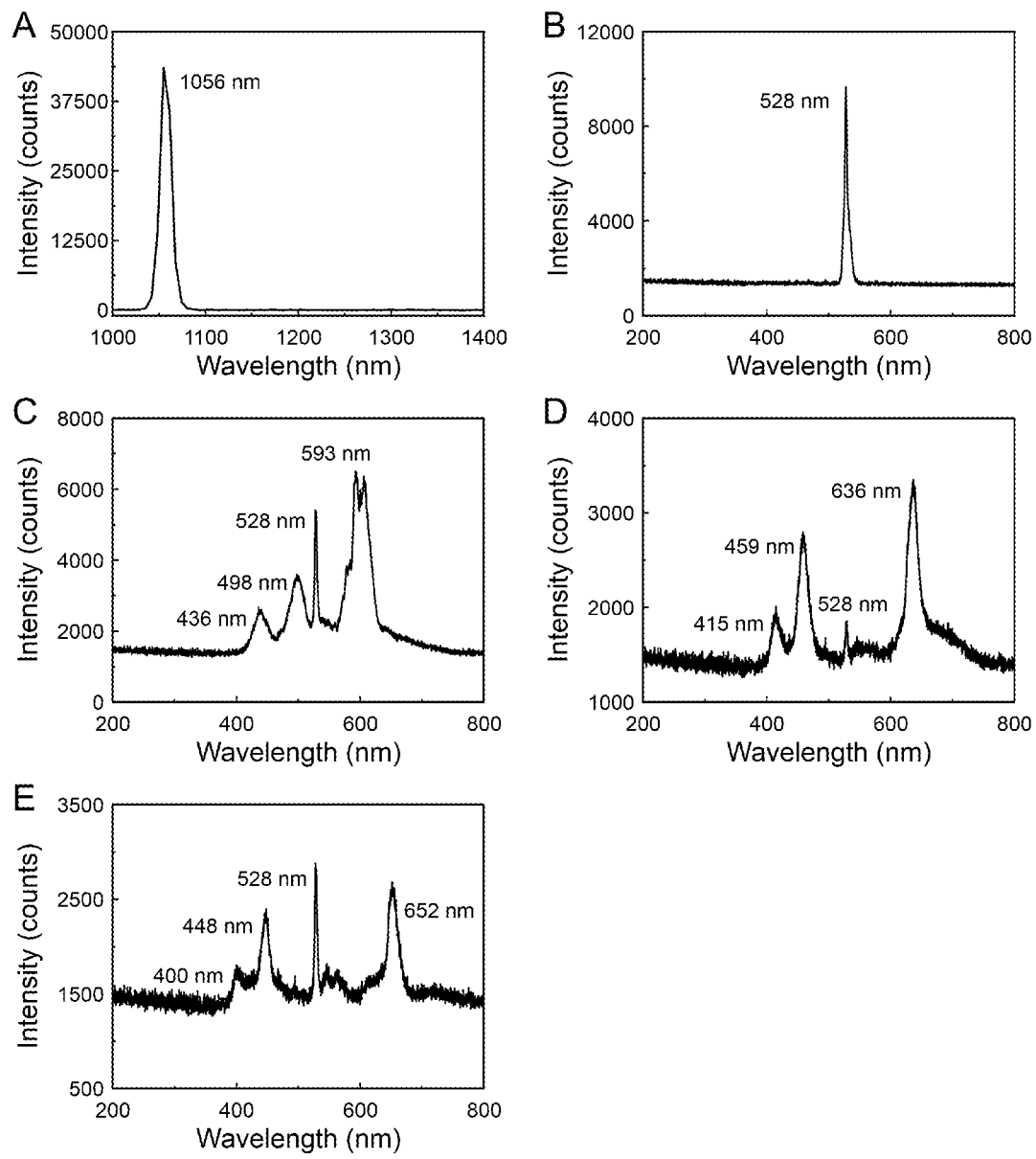
FIG. 14 shows the spectrogram obtained via the "sum-frequency optical parametric generation" solution based on 1056 nm pump light and a KDP crystal as described in Embodiment 5 of the invention.

FIG. 14 shows the signal light spectra obtained in different positions when the YCOB crystal is rotated, where Figure A is the spectrum of the pump light ($\lambda_p$=1056 nm), and FIG. 14(B) is the spectrum of the frequency doubling output ($\lambda_s$=528 nm) realized during the normal incidence of the crystal. The light path of the pump light in the crystal can be continuously changed by rotating the KDP crystal to satisfy the different sum-frequency phase-matching conditions, thereby realizing the continuous change of the wavelength $\lambda_s$ of the signal light and the output of the tunable sum-frequency parametric light. Based on the refraction law, the direction of light propagation within the crystal can be calculated from the external rotation angle of the crystal. FIGS. 14(C) to (E) show the spectra of the signal light obtained in several representative directions, namely $\theta$=42.6°, 43.7°, and 44.4°. The 0 is fixed as 45°. The results show that the installation can generate sum-frequency parametric light with $\lambda_s$ of 390-670 nm.

Figure 15:
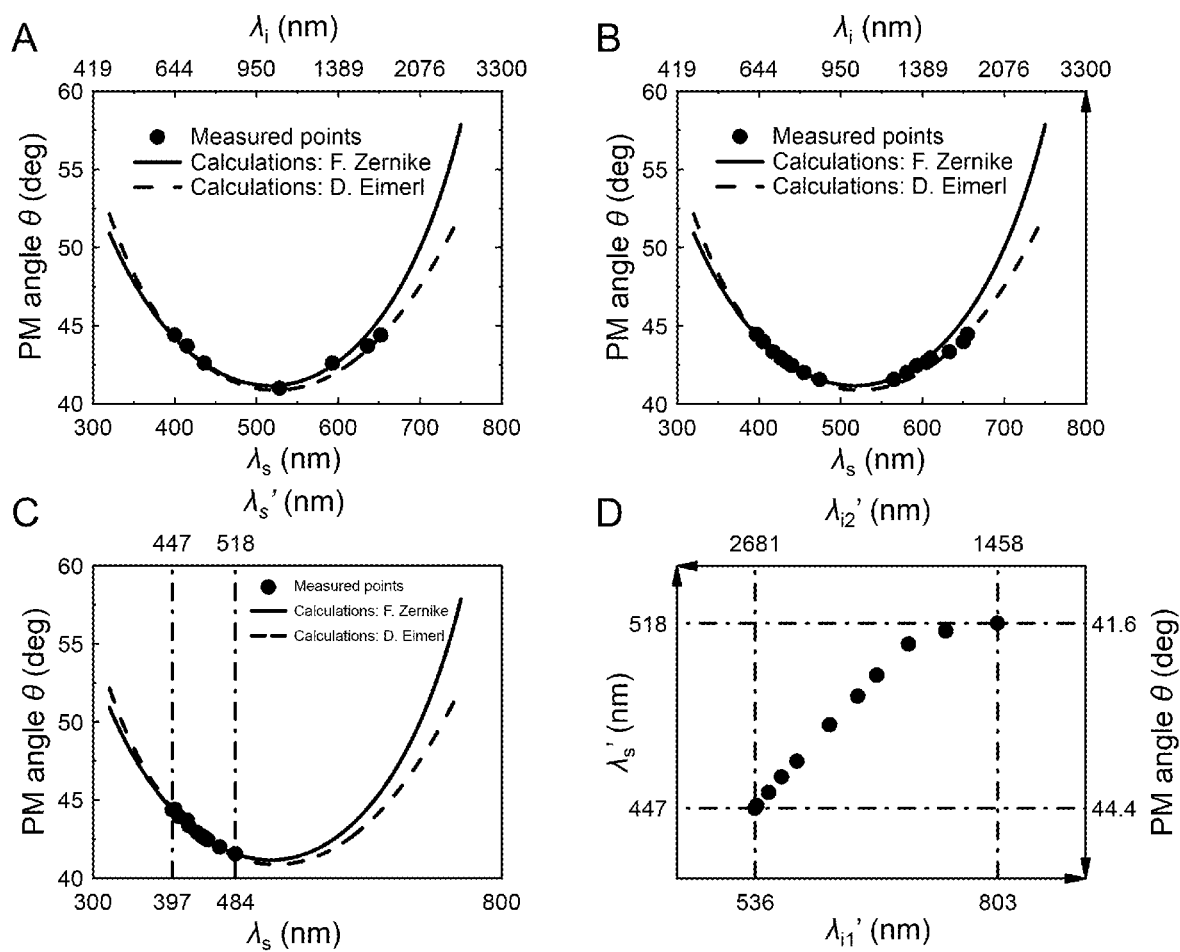
FIG. 15 shows the theoretical and experimental data obtained via the "sum-frequency optical parametric generation" solution based on 1056 nm pump light and a KDP crystal as described in Embodiment 5 of the invention.

FIG. 15 shows the sum-frequency phase-matching curve ($1/\lambda_p+1/\lambda_i=1/\lambda_s$, where: $\lambda_p$=1056 nm, $\lambda_s$ denotes the bottom X-coordinate, the corresponding $\lambda_i$ denotes the top X-coordinate, and the Y-coordinate is the phase-matching angle $\theta$) calculated for Embodiment 5, as well as the corresponding experimental points. The two refractive index dispersion equations from the literature "F. Zernike, J. Opt. Soc. Am. 54, 1215-1220, 1964" and "D. Eimerl, Ferroelectrics. 72, 95-139, 1987" are used as the basis for calculation, and the calculated results are presented by the solid line and the dotted line respectively. As can be seen from the figure, the theoretical results are correlated with the actual values, on the whole, it suggests that this effect is a sum-frequency process. Based on the recorded output light spectra, more experimental points can be obtained. As shown in FIG. 15(B), the sum-frequency theoretical calculations also agree well with the experimental value, which further confirms that this effect is a sum-frequency process. Additionally, another signal light $\lambda_s'$ is also found in the experiment, and its generation mechanism corresponds to the Figure D in FIG. 1, namely $1/\lambda_{i1}'+1/\lambda_{i2}'=1/\lambda_s'$. As shown in FIGS. 15(C) and (D), when $\lambda_s$ changes from 397 nm to 484 nm, $\lambda_s'$ changes from 447 nm to 518 nm; the corresponding $\lambda_{i1}'$ varies within 536-803 nm, and the $\lambda_{i2}'$ within 2681-1458 nm. If the pumping source and the non-linear optical medium are kept unchanged, the "sum-frequency optical parametric oscillation" solution in FIG. 3 can reduce the pump threshold and further improve the output power and conversion efficiency.

Embodiment 6

A "sum-frequency optical parametric generation" solution with a BBO crystal pumped by a 1053 nm laser as the non-linear optical medium. The installation used is similar to that shown in FIG. 2, with all parts arranged along the optical path. Among them, the pump light source 1 is a Yb$^{3+}$ ultrafast laser with a wavelength of 1053 nm, the focusing lens 3 is with a 300 mm focal length, and the non-linear optical medium 4 is a BBO crystal with the size of 10×10×10 mm$^3$ and processed along ($\theta$=45.8°, $\phi$=30°), a direction in which the wavelength of the sum-frequency signal light is 236 nm. When the crystal is rotated in the plane of $\phi$=30°, with the exterior angle changing from +30° to −30° around the normal incidence direction, the sum-frequency phase-matching angle in the crystal also changes from 62.9° to 28.7°, and the corresponding tunable range of $\lambda$ is 185-395 nm, covering the entire UV band that can propagate in the air. Such a tunable light source can meet the various demands for ultraviolet coherent light. For example, the 193 nm light can be used as the ultraviolet light source in the lithography, and the 325 nm light can replace the large-volume and high-noise He—Cd ion laser for medical diagnosis and irradiating treatment, such as checking the five sense organs for cancer and acupoint radiation to treat hypertension and chronic hepatitis, etc.

Embodiment 7

A "sum-frequency optical parametric generation" solution used for the tunable frequency conversion of ultrafast and ultra-intense lasers. The installation used is similar to that shown in FIG. 2, with all parts arranged along the optical path. Among them, the pump light source 1 is an ultrafast and ultra-intense laser with a wavelength of 1053 nm and a peak power between TW and EW. As the pumping source has a high power density already, it needs no focusing. Therefore, the focusing lens 3 is omitted. The non-linear optical medium 4 is a KDP crystal with a thickness of 10 mm. Its sectional area depends on the diameter of the installation and varies between 100×100 mm$^2$ and 500×500 mm$^2$. Its tangent angle is ($\theta$=46.2°, $\phi$=45°), a direction in which the wavelength of the sum-frequency signal light is 660 nm and 370 nm. When the crystal is rotated in the plane of $\phi$=45°, with the exterior angle changing from +7.5° to −7.5° around the normal incidence direction, the sum-frequency phase-matching angle in the crystal also changes from 51.2° to 41.2°, and the corresponding tunable range of $\lambda_s$ is 318-710 nm, covering the entire visible waveband. Such an installation can be used for laser fusion, studies of ultrarelativistic phenomena, and laboratory astrophysics.

Embodiment 8

Figure 16:
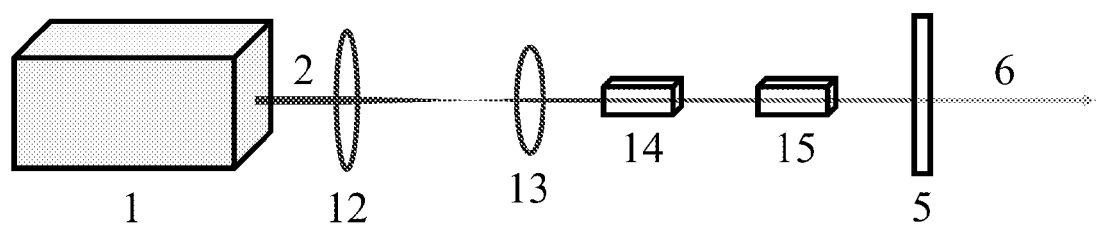
FIG. 16 shows the diagram of the installation for the "sum-frequency optical parametric generation" solution capable of outputting dual-wavelength signal light as described in Embodiments 8, 9, and 10 of the invention.

A dual-wavelength sum-frequency optical parametric generator used for ultraviolet differential absorption laser radars. Its construction is as shown in FIG. 16, with all parts arranged along the optical path. Among them, the pump light source 1 is a Yb$^{3+}$ ultrafast laser with a wavelength of 1053 nm, and the focal lengths of the front mirror 12 and the rear mirror 13 of the beam reduction system are 300 mm and 100 mm respectively. The first non-linear optical medium 14 is a BBO crystal with a size of 10×10×10 mm$^3$ and a tangent angle of ($\theta$=43°, $\phi$=30°), a direction in which the wavelength of the sum-frequency signal light is 250 nm, while the second non-linear optical medium 15 is a BBO crystal with a size of 10×10×10 mm$^3$ and a cutting angle of ($\theta$=30°, $\phi$=30°), a direction in which the wavelength of the sum-frequency signal light is 370 nm. Since the wavelengths 250 nm and 370 nm correspond to the absorption peak and valley of ozone, respectively, this dual-wavelength light source can be used in UV differential absorption laser radars to accurately measure the ozone concentration in the stratosphere. In addition, by adjusting the directions or temperatures of the two crystals, the output wavelengths can be tuned to conduct UV differential absorption measurement for other gases conveniently and flexibly.

Embodiment 9

A dual-wavelength sum-frequency optical parametric generator used for hemoglobin detection of carbon monoxide poisoning. Its construction is as shown in FIG. 16, with all parts arranged along the optical path. Among them, the pump light source 1 is an ultrafast laser with a wavelength of 1550 nm, and the focal lengths of the front mirror 12 and the rear mirror 13 of the beam reduction system are 300 mm and 100 mm respectively. The first non-linear optical medium 14 is a GdCOB crystal with a size of 10×10×10 mm$^3$ and a tangent angle of ($\theta$=156°, $\phi$=0°), a direction in which the wavelength of the sum-frequency signal light is 555 nm, while the second non-linear optical medium 15 is a YCOB crystal with a size of 10×10×10 mm$^3$ and a tangent angle of ($\theta$=147°, $\phi$=0°), a direction in which the wavelength of the sum-frequency signal light is 540 nm. Since the wavelengths 555 nm and 540 nm basically correspond to the absorption peak and valley of carbonyl hemoglobin respectively, this dual-wavelength light source can be used to detect carbonyl hemoglobin, thus determining the extent of carbon monoxide poisoning. In addition, by adjusting the directions or temperatures of the two crystals, the output wavelengths can be tuned to measure the blood content of alcohol and other substances conveniently and flexibly.

Embodiment 10

A dual-wavelength sum-frequency optical parametric generator used to treat intractable port-wine stains. Its construction is similar to that in FIG. 7, with all parts arranged along the optical path. Among them, the pump light source 1 is a Yb$^{3+}$ ultrafast laser with a wavelength of 1053 nm, and the focal lengths of the front mirror 12 and the rear mirror 13 of the beam reduction system are 300 mm and 100 mm respectively. The non-linear optical medium 4 is a KDP crystal with a size of 10×10×10 mm$^3$ and a tangent angle of ($\theta$=42.5°, $\phi$=45°), a direction in which the wavelength of the sum-frequency signal light is 595 nm. The color filter 5 is omitted here, so the remaining pump light is output together with the signal light to form a 1053 nm and 595 nm dual-wavelength laser. The 595 nm light can be specifically absorbed by the oxyhemoglobin in blood vessels to form methemoglobin instantly. The methemoglobin can hardly absorb the 595 nm light, but can absorbed the 1053 nm light. Such a synergistic thermal effect can greatly improve the therapeutic effect of the intractable port-wine stains and reduce adverse reactions. In addition, by adjusting the direction or temperature of the KDP crystal, the wavelengths of the signal light can be tuned to treat other skin complaints conveniently and flexibly.

Embodiment 11

A sum-frequency optical parametric generator capable of outputting white light. Its construction is as shown in FIG. 16, with all parts arranged along the optical path. Among them, the pump light source 1 is an ultrafast laser with a wavelength of 1550 nm, and the focal lengths of the front mirror 12 and the rear mirror 13 of the beam reduction system are 300 mm and 100 mm respectively. The first non-linear optical medium 14 is a BBO crystal with a size of 10×10×10 mm$^3$ and a tangent angle of ($\theta$=24.4°, $\phi$=30°), a direction in which the wavelength of the sum-frequency signal light is 445 nm, while the second non-linear optical medium 15 is a BBO crystal with a size of 10×10×10 mm$^3$ and a tangent angle of ($\theta$=21.3°, $\phi$=30°), a direction in which the wavelength of the sum-frequency signal light is 580 nm. The wavelengths 445 nm and 580 nm can realize white light output by superimposing with each other. In addition, by adjusting the directions or temperatures of the two crystals, the output wavelengths can be tuned to adjust the color temperature of the white light conveniently and flexibly.

What is claimed is:

1. A parametric light generation method comprising:
   a single-frequency pump light $\omega_p$ (corresponding to wavelength $\lambda_p$) being incident on a nonlinear optical material;
   the nonlinear optical material having an energy conservation condition $\omega_p + \omega_i = \omega_s$ and a momentum conservation condition $n_p \omega_p + n_i \omega_i = n_s \omega_s$, wherein s denotes signal light, p denotes pump light, and i denotes idle frequency light; two physical effects occur in the nonlinear optical material: multi-photon absorption and relaxation which is capable of generating $\omega_i$ photons; output of the nonlinear optical material being sum-frequency signal light ($\omega_s = \omega_p + \omega_i$), and the frequency of an outgoing light being greater than the frequency of incident pump light ($\omega_s > \omega_p$); the single-frequency pump light is capable of being converted into visible light and ultraviolet light with higher frequencies;
   when the single-frequency pump light op is fixed, adjusting the nonlinear optical material into sum-frequency phase to achieve a broad range of outgoing light frequency $\omega_s$ tuning; changes of frequency of the outgoing light are independent of the changes of frequency of the incident pump light.

2. The parametric light generation method according to claim 1, characterized in that adjusting space direction, temperature, voltage, or microstructure parameters of the nonlinear optical material realizes a continuous change of the wavelength of $\lambda_s$ and a continuous change of output of the tunable sum-frequency parametric light.

3. The parametric light generation method according to claim 1, characterized in that the nonlinear optical material is capable of generating and amplifying light waves with wavelengths of $\lambda_i$ and $\lambda_s$ spontaneously through parametric scattering or parametric fluorescence of the nonlinear optical material;
   or, the nonlinear optical material is capable of generating and amplifying the light waves with wavelengths of $\lambda_i$ and $\lambda_s$ spontaneously by the nonlinear optical material through the parametric scattering or the parametric fluorescence of the nonlinear optical material, while adding cavity mirrors at both ends of the nonlinear optical material to form a resonant cavity which makes the signal light reflects and bounces back to gain an enhanced output;
   or, providing the signal light $\lambda_s$, $\lambda_p$, and $\lambda_s$ with lower energy at input end, and the signal light $\lambda_s$, $\lambda_p$, and $\lambda_s$ interacting with each other to satisfying the energy conservation condition and the momentum conservation condition that amplify the signal light at the output end of the pump light.

4. The parametric light generation method according to claim 1, characterized in that the nonlinear optical material is a crystal with a periodic structure that can realize a quasi-phase matching.

5. The parametric light generation method according to claim 4, characterized in that the crystal is selected from the group consisting of gadolinium calcium oxoborate (Gd- COB) crystal, yttrium calcium oxy borate (YCOB) crystal, potassium dihydrogen phosphate (KDP) crystal and beta barium borate (BBO) crystal.

6. The parametric light generation method according to claim 1, characterized in that the single-frequency pump light is a pulse laser.

7. The parametric light generation method according to claim 1, characterized in that the pump light is a 1540 nm femtosecond laser: when the nonlinear optical material is a GdCOB crystal processed along (θ=146°, φ=0°), adjusting the energy conservation condition and the momentum conservation condition to obtain visible waveband of 485-770 nm for the tunable laser output by rotating the gadolinium calcium oxoborate (GdCOB) crystal; when the nonlinear optical material is a yttrium calcium oxy borate (YCOB) crystal processed along (θ=140°, φ=0°), adjusting the energy conservation condition and the momentum conservation condition to obtain visible waveband of 450-770 nm for the tunable laser output by rotating the yttrium calcium oxy borate (YCOB) crystal.

8. The parametric light generation method according to claim 1, characterized in that the pump light is a 1056 nm femtosecond laser, and when the nonlinear optical material is a yttrium calcium oxy borate (YCOB) crystal processed along (θ=149°, φ=0°), adjusting the energy conservation condition and the momentum conservation condition to obtain a tunable laser output at visible waveband of 425-528 nm by rotating the yttrium calcium oxy borate (YCOB) crystal;

or, the pump light is the 1056 nm femtosecond laser, and when the nonlinear optical material is a KDP crystal processed along (θ=41°, φ=45°), adjusting the energy conservation condition and the momentum conservation condition to obtain the tunable laser output at visible waveband of 390-670 nm by rotating the KDP crystal;

or, the pump light is the 1056 nm femtosecond laser, and when the nonlinear optical material is a β-BBO crystal processed along (θ=23°, φ=30°), adjusting the energy conservation condition and the momentum conservation condition to obtain the tunable laser output at visible waveband of 185-526.5 nm by rotating the β-BBO crystal.

9. A parametric light generator comprising a pump light source and a nonlinear optical material sequentially arranged along an optical path;

the pump light source having a single-frequency pump light $\omega_p$ (corresponding to wavelength $\lambda_p$) being incident on the nonlinear optical material;

the nonlinear optical material having an energy conservation condition $\omega_p+\omega_i=\omega_s$ and a momentum conservation condition $n_p\omega_p+n_i\omega_i=n_s\omega_s$, wherein s denotes signal light, p denotes pump light, and i denotes idle frequency light; two physical effects occur in the nonlinear optical material: multi-photon absorption and relaxation which is capable of generating $\omega_i$ photons; output of the nonlinear optical material is sum-frequency signal light ($\omega_s=\omega_p+\omega_i$), and the frequency of an outgoing light is greater than the frequency of incident pump light ($\omega_s>\omega_p$); the single-frequency pump light is capable of being converted into visible light and ultraviolet light with higher frequencies;

when the single-frequency pump light op is fixed, adjusting the nonlinear optical material into sum-frequency phase to achieve a wide range of outgoing light frequency $\omega_s$ tuning; changes of frequency of the outgoing light are independent of the changes of frequency of the incident pump light; and a focusing lens being provided between the pump light source and the nonlinear optical material.

10. The parametric light generating device according to claim characterized in that a color filter is arranged after the nonlinear optical material along the light path;

an input mirror of optical parametric oscillation is provided between the focusing lens and the nonlinear optical material along the light path, and an output mirror for optical parametric oscillation is provided after the nonlinear optical material.

11. The parametric light generating device according to claim 9, characterized in that a signal light source, a signal light reflecting mirror, and a beam combiner for the pump light and the signal light are also provided to enable the signal light generated by the signal light source to enter the focusing lens together with the pump light generated by the pump light source upon the reflecting of a signal light reflecting mirror and combining of the beam combiner for the pump light and the signal light.

12. The parametric light generating device according to claim 9, characterized in that after the nonlinear optical material is provided the second nonlinear optical material along the optical path, between the pump light source and the nonlinear optical material are provided with a front mirror and a rear mirror of a beam reduction system; and a color filter is arranged after the second nonlinear optical material.

* * * * *